United States Patent [19]
Katerberg

[11] Patent Number: 4,613,871
[45] Date of Patent: Sep. 23, 1986

[54] GUARD DROPS IN AN INK JET PRINTER

[75] Inventor: James A. Katerberg, Kettering, Ohio

[73] Assignee: Eastman Kodak Company, Rochester, N.Y.

[21] Appl. No.: 797,094

[22] Filed: Nov. 12, 1985

[51] Int. Cl.[4] .......... G01D 15/18
[52] U.S. Cl. .......... 346/1.1; 346/75
[58] Field of Search .......... 346/1.1, 75

[56] References Cited

U.S. PATENT DOCUMENTS 3,562,757 2/1971 Bischoff .......... 346/1.1
3,833,910 9/1974 Chen .......... 346/1.1
4,086,601 4/1978 Fillmore et al. .......... 346/75
4,490,729 12/1984 Clark et al. .......... 346/75

FOREIGN PATENT DOCUMENTS 0104951 4/1984 European Pat. Off. .......... 460/126

*Primary Examiner*—E. A. Goldberg
*Assistant Examiner*—Gerald E. Preston
*Attorney, Agent, or Firm*—Thomas H. Close

[57] ABSTRACT

A continuous multi-jet ink jet printer produces a pattern of guard drops such that each drop in a jet is separated by one or more guard drops, drops from jet-to-jet in a row are separated by one or more guard drops, and the pattern includes one or more rows of all guard drops to thereby reduce the raggedness of edges in characters produced by the ink jet printer.

9 Claims, 19 Drawing Figures

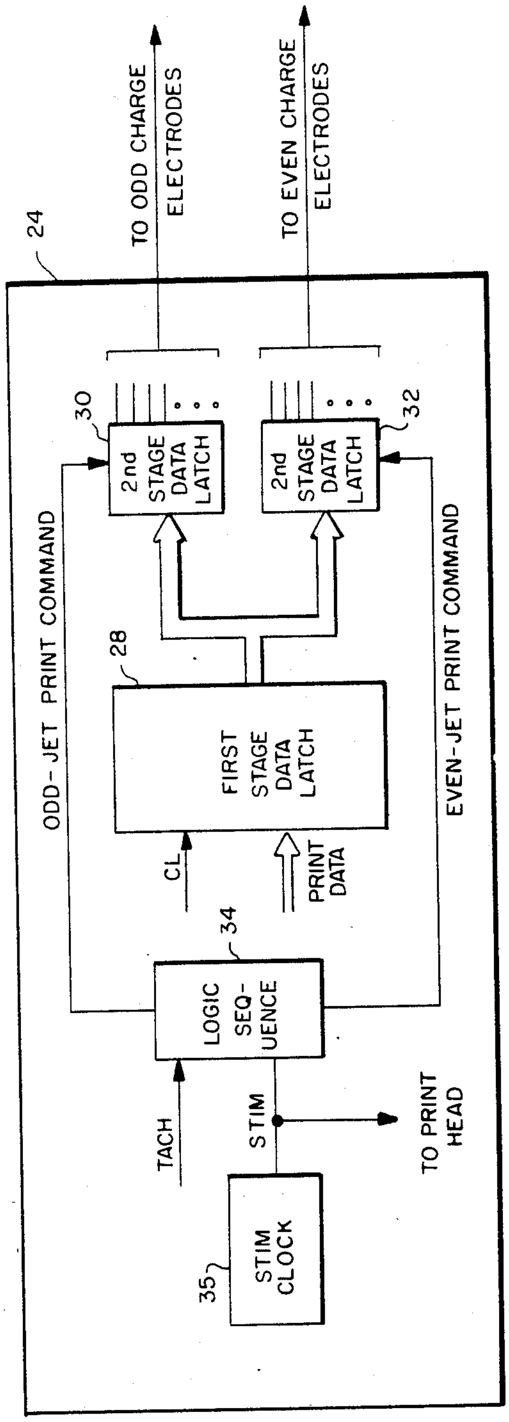
FIG. 4
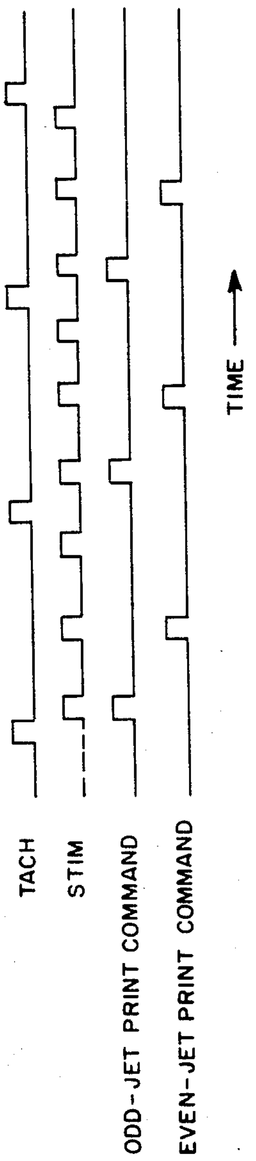
FIG. 5a
FIG. 5b
FIG. 5c
FIG. 5d

FIG. 6a
FIG. 7a
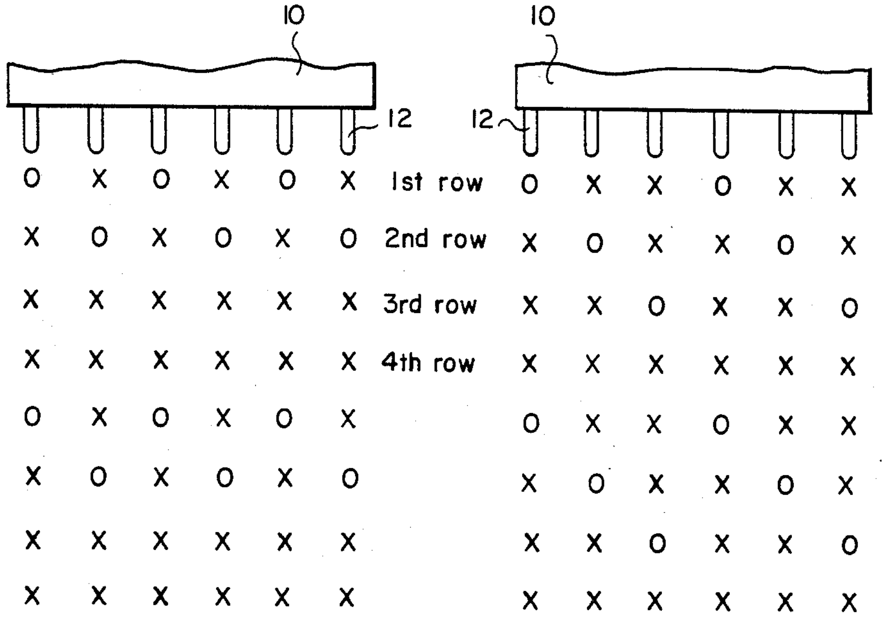
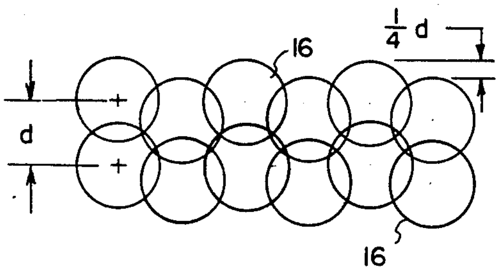
FIG. 6b
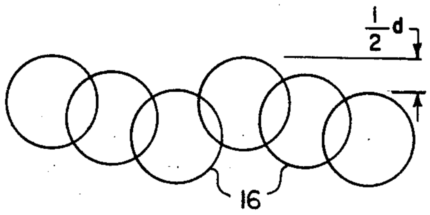
FIG. 7b

FIG. 9a
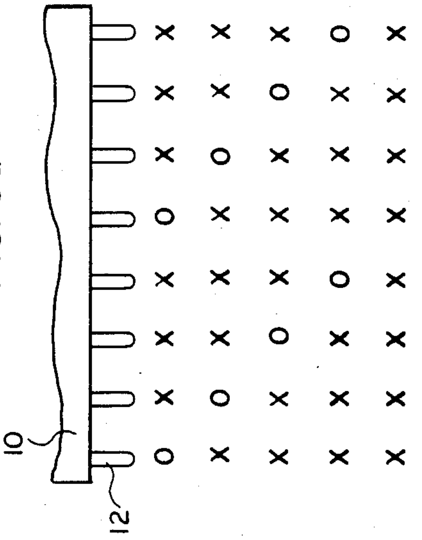
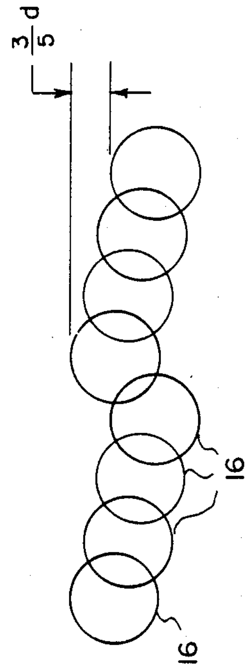
FIG. 9b
FIG. 8a
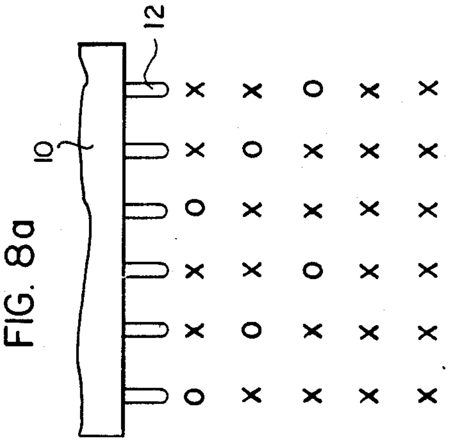
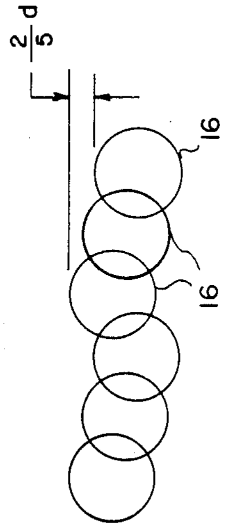
FIG. 8b

GUARD DROPS IN AN INK JET PRINTER

TECHNICAL FIELD

The present invention relates to an ink jet printer and more particularly to a continuous multi-jet ink jet printer and printing method wherein guard drops are produced to reduce drop-to-drop and jet-to-jet crosstalk.

BACKGROUND ART

In a continuous multi-jet ink jet printer, a row of continuous ink jets are stimulated to produce a two-dimensional array of ink drops that are directed to a print receiving medium. The individual ink drops are selectively charged by a row of drop charging electrodes located adjacent the ink jets. Depending on the charge applied to the drops, they are deflected along one or more print trajectories to arrive at the print receiving medium, or they are deflected along a catch trajectory to be caught by a drop catcher. In high resolution ink jet printers, two types of drop charging inaccuracies can occur. One type, called drop-to-drop crosstalk, results from the influence of previously charged drops on subsequent drops in a single ink jet. The other type, called jet-to-jet crosstalk, results from the influence of the charge on neighboring electrodes. These two types of charging inaccuracies cause variations in drop placement on the print receiving medium, and hence a deterioration in the characters formed by the ink jet printer.

One approach to solving this crosstalk problem is described in published European Patent Application No. 0 104 951, published Apr. 4, 1984 by the Mead Corporation. According to this approach, a pattern of guard drops, charged to a catch potential, are provided to isolate the print drops from the influence of other print drops. According to the method, one or more guard drops are provided between consecutive print drops in each column to reduce drop-to-drop crosstalk, and one or more guard drops are provided between print drops in each row to reduce jet-to-jet crosstalk. The print drops are either printed or caught depending upon tne pattern to be produced; the guard drops are always caught. FIG. 2*a* shows an example of this technique applied to an ink jet print head having a single row of ink jets. In FIG. 2*a*, a portion of an ink jet print head 10 is shown schematically, with a plurality of ink jets 12 issuing therefrom. The ink jets break into drops 14, and the drops 14 are selectively charged by electrodes, not shown, to provide print drops, indicated by O's, and a pattern of guard drops, indicated by X's. Two guard drops are provided between consecutive print drops in both the row and column directions.

To print with such an ink jet print head, the print receiving medium is moved relative to the row of ink jets in a direction perpendicular to the row and at such a velocity that the successive print drops from each jet slightly overlap. An example of the resulting print is shown schematically in FIG. 2*b*. The printed drops 16 in each column are spaced apart by a distance d to provide the desired overlap between the print drops. As seen in FIG. 2*b*, the top and bottom edges of the print sample have a more ragged edge than the sides, due to tne provision of the guard drops in the drop pattern. In this example, the raggedness in the top and bottom edges has an amplitude of $\frac{3}{8}$ d.

Thus, although the use of guard drops has reduced the inaccuracies in drop placement caused by jet-to-jet and drop-to-drop crosstalk, the guard jet method introduces a new source of raggedness in the edges of characters produced by the ink jet printer.

It is therefore the object of the present invention to provide a method and apparatus for producing guard drops in an ink jet printer that reduces the visibility of this edge raggedness.

DISCLOSURE OF THE INVENTION

The object of the present invention is achieved by providing in a repeating pattern of guard drops, one or more rows having all guard drops. In a preferred embodiment of the invention, in the first row of a three row repeating pattern, alternate drops are print drops, and the remaining drops are guard drops. In the second row, the location of the guard drops and print drops are reversed from those in the first row, and in a third row all the drops are guard drops.

BRIEF DESCRIPTION OF THE DRAWINGS

FIG. 4 is a schematic diagram showing data processing apparatus useful with the practice of a preferred mode of the present invention;

FIGS. 5*a–d* are timing diagrams showing the operation of the data processing apparatus shown in FIG. 4;

FIGS. 6*a* and 6*b* are schematic diagrams showing an alternative guard jet pattern having two complete rows of guard drops, and resulting line segment, respectively;

FIGS. 7*a* and 7*b* are schematic diagrams showing another alternative guard drop pattern having a repeating pattern of four rows and resulting line segment, respectively;

FIGS. 8*a* and 8*b* are schematic diagrams showing a guard drop pattern similar to the pattern shown in FIG. 7*a* having two complete rows of guard drops, and a resulting line segment, respectively;

FIGS. 9*a* and 9*b* are schematic diagrams showing another alternative guard drop pattern having a repeating pattern of five rows and a resulting line segment, respectively.

MODES OF CARRYING OUT THE INVENTION

Figure 3:
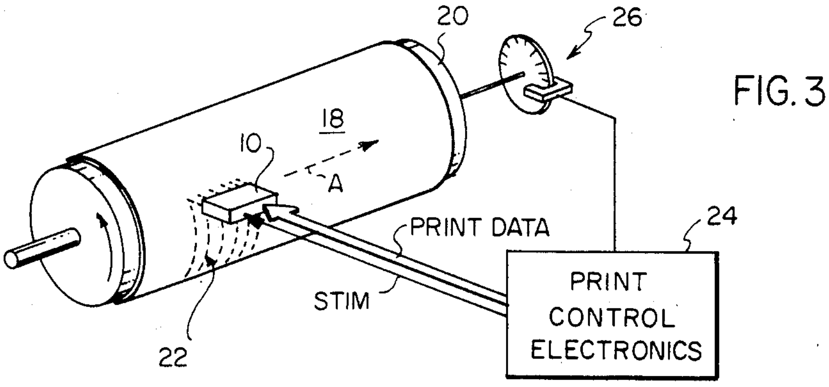
FIG. 3 is a schematic diagram showing an ink jet printer of the type useful for practicing the present invention.

Referring first to FIG. 3, an ink jet printer of the type useful in carrying out the present invention will be described. The ink jet printer includes a continuous multi-jet ink jet print head 10 that is positioned with respect to a print receiving medium, such as paper 18, to deposit rows of ink drops on the paper. The paper is translated past the ink jet print head 10 by a rotating drum 20. The paper is positioned on the drum so that one line of characters 22 is formed with each rotation of the drum, after which, the print head 10 is displaced by one line in the direction of arrow A, and another line of print is produced. Print control electronics 24 receive a tachometer signal from a tachometer 26 attached to the drum, and apply print control and drop stimulation signals to the print head 10.

Figure 1A:
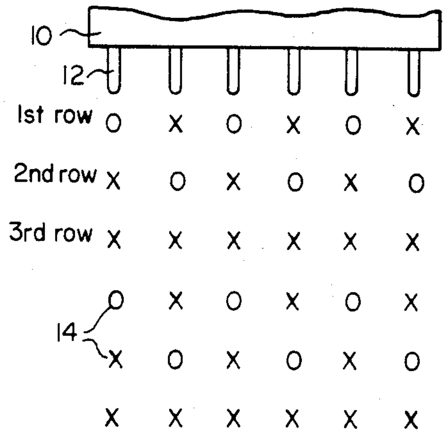
FIGS. 1*a* and 1*b* are schematic diagrams showing a pattern of guard drops produced according to the present invention, and a greatly magnified line segment resulting from such a pattern, respectively.

FIG. 1*a* shows a pattern of guard drops according to the present invention for reducing edge raggedness in printed characters produced by the ink jet printer. As seen in FIG. 1*a*, the ink jet print head 10 produces a repeating pattern of guard drops indicated by X's comprising a first row in which alternate drops are print drops and the remaining drops are guard drops, a second row in which the position of the print drops and guard drops are reversed from those in the first row, and a third row in which all the drops are guard drops. As described above with respect to the prior art, the print receiving medium is moved with respect to the ink jet print head 10 at a velocity such that a predetermined amount of overlap is produced between consecutive printed drops in each column. As a result the printed drops in each column are spaced apart by a distance d from center to center. However, due to the presence of the full row of guard drops, the edge raggedness has been significantly reduced.

Figure 1B:
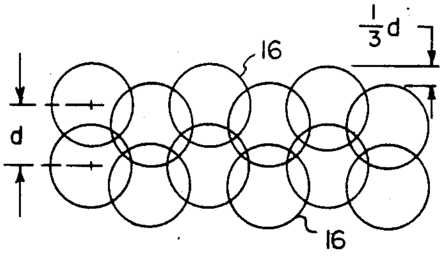

FIG. 1*b* shows schematically a portion of a line segment generated by the ink jet print head having a pattern of guard drops according to the present invention. As can be seen in FIG. 1*b*, the raggedness of the top and bottom edge has been reduced to $\frac{5}{8}$ d, from $\frac{2}{3}$ d as in the prior art shown in FIG. 2*b*. This reduction in edge raggedness can provide a visible improvement in the quality of characters produced by the ink jet printer.

FIG. 4 shows a portion of the print control electronics 24 of the ink jet printer in more detail. The print control electronics 24 includes a first stage data latch 28 that receives one repeat cycle of print data at a time. A repeat cycle is defined as all the print drop control information between the full lines of guard drops. In the example shown in FIG. 4, for operating the ink jet printer according to the pattern shown in FIG. 1, a repeat cycle comprises two rows of print control data. In the first row of print control data, only the odd numbered jets contain print drops. In the second row, the even numbered jets contain print drops. The repeat cycle of print data is separated into first and second rows and sent to a pair of second stage data latches 30 and 32 respectively. A logic sequencer 34 receives the signal (FIG. 5*a*) from the tachometer 26 and the signal (FIG. 5*b*) from a stimulation clock 35 and generates an odd numbered jet print command (FIG. 5*c*) and an even numbered jet print command (FIG. 5*d*) that are applied to the second stage data latches 30 and 32 respectively to send the respective print data to the odd and even numbered charge electrodes of the print head. In the absence of a print signal from the second stage data latches, the charge electrodes are supplied with a potential that produces a catch charge on the drops. As shown in FIGS. 5*a–d*, the logic sequencer produces neither an odd jet print command nor an even jet print command for every third stimulation cycle, thereby periodically producing the complete row of guard drops in the guard drop pattern.

FIG. 6*a* shows a pattern of guard drops according to the present invention wherein two complete rows of guard drops are provided in the guard drop pattern, thereby further reducing the raggedness in the edges of printed characters. The pattern shown in FIG. 6*a* comprises a four row pattern wherein the first and second rows are the same as the pattern of FIG. 1*a*, and the third and fourth rows are all guard drops. This pattern results in three guard drops between each print drop in each jet. FIG. 6*b* shows the resulting pattern of printed drops. The raggedness has been reduced to $\frac{1}{4}$ d. The further addition of complete rows of guard drops in the pattern will result in a further improvement in raggedness, however it should be noted that there is a trade-off in printer speed involved in achieving the improvement, since it takes longer to print a line of characters when additional rows of guard drops are added to the pattern.

FIG. 7*a* shows another pattern for providing three guard drops between each print drop in each jet and two guard drops between adjacent print drops in adjacent jets to reduce drop-to-drop crossstalk and to further reduce jet-to-jet crosstalk. This pattern comprises a first row wherein every third drop is a print drop, a second row similar to the first, but displaced by one column, a third row similar to the first but displaced by two columns, and a fourth row of all guard drops. For this pattern, the repeat cycle comprises three rows of print control signals, and the apparatus for implementing the pattern includes three second stage data latches, one for each row of print control signals. FIG. 7*b* illustrates the edge raggedness that results from such a pattern. As shown in FIG. 7*b*, the edge raggedness is equal to $\frac{1}{2}$ d. FIGS. 8*a* and 8*b* illustrate that by adding another complete row of guard drops to the pattern shown in FIG. 7*a*, the edge raggedness is reduced to 2/5 d.

FIGS. 9*a* and *b* show a pattern of guard drops having a complete row of guard drops according to the present invention, including four guard drops between successive print drops in each jet, and three guard drops between adjacent print drops in adjacent columns to further reduce drop-to-drop and jet-to-jet crosstalk. As shown in FIG. 9*b*, the edge raggedness is 3/5 d for this pattern.

Figure 2A:
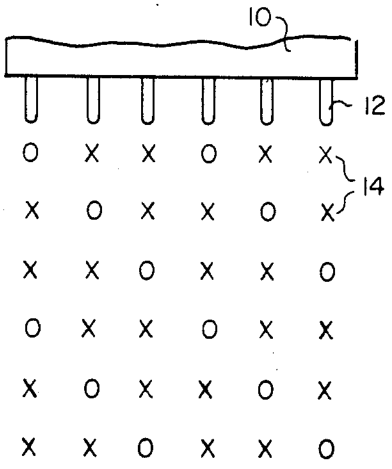
FIG. 2a (PRIOR ART)
FIGS. 2*a* and 2*b* are schematic diagrams showing a prior art pattern of guard drops, and a greatly magnified line segment resulting from such a pattern, respectively.
Figure 2B:
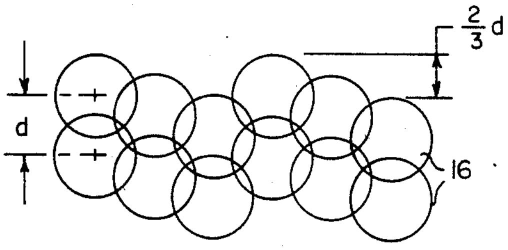
FIG. 2b (PRIOR ART)
Figure 10:
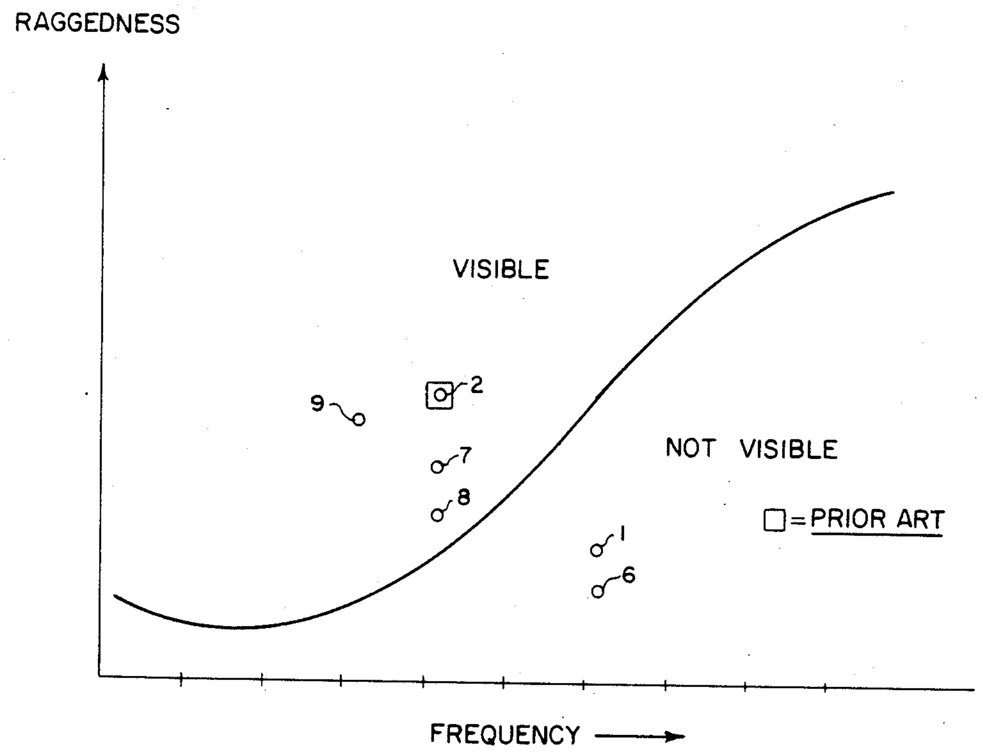
FIG. 10 is a graph showing the amount of raggedness resulting from the prior art pattern of guard drops and patterns of guard drops produced according to the present invention.

FIG. 10 is a graph that illustrates the improvement in edge raggedness achieved by the present invention. The graph is a plot of raggedness vs. frequency for a 12 dot per mm pattern viewed at normal reading distance. The continuous line on the graph is an empirically derived dividing line that separates the space into a first region where the raggedness is visible to the human eye and a second region where the raggedness is not visible. The points on the graph indicate where the edge raggedness for the patterns shown in FIGS. 1, 2, 6, 7, 8, and 9 lie on the graph. The points are labeled to correspond to the Figure numbers which they represent, and the point representing the prior art guard drop pattern shown in FIG. 2 is enclosed in a box. As can be seen from FIG. 10, the appearance of edge raggedness is improved by the method of the present invention. If the resolution of the printer were lowered, for example, by providing larger, wider spaced drops, all of the points on the graph would be displaced upwardly and to the left. On tne other hand if the resolution of the printer were raised by providing smaller and more closely spaced drops, all of the points would be displaced downwardly and to the right. By employing the technique of the present invention, lower resolution can be used and still provide acceptable results.

INDUSTRIAL APPLICABILITY AND ADVANTAGES

Thus it can be seen that the method of the present invention can be used in ink jet printers to improve the appearance of raggedness of the edges of characters, and depending upon the resolution of the printer, may render the appearance of the raggedness of the edges of printed characters invisible to the human eye.

I claim:

1. A method of producing guard drops in a continuous multi-jet ink jet printer of the type including means for producing a rectangular array of ink drops, said array having columns corresponding to the consecutive drops in a single jet, and rows corresponding to drops simultaneously produced from all of the jets, said method including the steps of providing a repeating pattern of one or more guard drops between print drops in a row and one or more guard drops between print drops in a column, characterized by: said pattern including one or more entire rows of guard drops.

2. A method of producing guard drops claimed in claim 1, wherein said pattern comprises a first row wherein every other drop is a print drop and the rest are guard drops, a second row wherein the locations of the print drops and guard drops are reversed, and a third row having all guard drops.

3. The method of producing guard drops claimed in claim 2, wherein said pattern further includes a fourth row having all guard drops.

4. The method of producing guard drops claimed in claim 1, wherein said pattern comprises a first row wherein every third drop is a print drop and the rest are guard drops, a second row similar to said first row but displaced by one drop in a first direction, a third row similar to said second row but further displaced by one drop in said first direction, and a fourth row having all guard drops.

5. The method of producing guard drops claimed in claim 4, wherein said pattern further includes a fifth row having all guard drops.

6. The method of producing guard drops claimed in claim 1, wherein said pattern comprises a first row having every fourth drop a print drop and the rest guard drops, second, third and fourth rows similar to said first row but progressively displaced by one drop, and a fifth row comprising all guard drops.

7. The method of producing guard drops claimed in claim 6, wherein said pattern further includes a sixth row comprising all guard drops.

8. Ink jet printing apparatus comprising:

a. a print head for generating a plurality of continuous ink jets, arranged in a row and directed toward a print receiving medium, said print head including,
   (1) means for synchronously stimulating said ink jets to produce an array of rows and columns of ink drops, said columns of ink drops corresponding to consecutive drops in a jet, and said rows corresponding to drops simultaneously produced from all of said jets, and
   (2) a plurality of drop charging electrodes positioned adjacent the row of ink jets;

b. means for applying control signals to the drop charging electrodes, each control signal being selectively variable between at least one print potential and a catch potential, whereby drops having a print charge level or a catch charge level are produced, said means for applying control signals including means for applying said catch charge level to a predetermined respective pattern of guard drops, whereby print drops having either a print charge level or a catch charge level are separated in both rows and columns by one or more guard drops always having a catch charge level, said pattern of guard drops including one or more entire rows of guard drops.

9. The ink jet printing apparatus claimed in claim 8, wherein said pattern of guard drops comprises a first row having print drops alternating in every other column, a second row wherein the location of the print drops and guard drops are reversed, and a third row having all guard drops, and said means for applying control signals further comprising;

a first stage data latch to receive a row of control signals for one repeat cycle of print control data, a first second stage data latch for receiving control signals for odd numbered columns, and a second second stage data latch for receiving the control signals for even numbered columns, and logic sequencing means for applying said control signals for said odd numbered columns to odd numbered drop charging electrodes during said first row of said pattern, and for applying said control signals for said even numbered columns to said even numbered drop charging electrodes during said second row of said pattern.

* * * * *